US008435479B2

(12) United States Patent
Fradette et al.

(10) Patent No.: US 8,435,479 B2
(45) Date of Patent: *May 7, 2013

(54) PROCESS FOR TREATING CARBON DIOXIDE CONTAINING GAS

(75) Inventors: Sylvie Fradette, Quebec (CA); Jean Ruel, Quebec (CA)

(73) Assignee: CO2 Solutions Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/592,422

(22) Filed: Aug. 23, 2012

(65) Prior Publication Data
US 2013/0011897 A1    Jan. 10, 2013

Related U.S. Application Data

(63) Continuation of application No. 13/273,391, filed on Oct. 14, 2011, now Pat. No. 8,277,769, which is a continuation of application No. 12/586,857, filed on Sep. 28, 2009, now Pat. No. 8,066,965, which is a continuation of application No. 10/529,168, filed as application No. PCT/CA03/01496 on Sep. 29, 2003, now Pat. No. 7,596,952.

(30) Foreign Application Priority Data

Sep. 27, 2002  (CA) .................................. 2405635

(51) Int. Cl.
    C01F 5/24    (2006.01)
(52) U.S. Cl.
    USPC .......................................... 423/432; 60/39.5
(58) Field of Classification Search ................. 423/432; 60/39.5, 772
    See application file for complete search history.

(56) References Cited

U.S. PATENT DOCUMENTS

| 534,498 A | 2/1895 | Descamps |
| 1,450,770 A | 4/1923 | Frick et al. |
| 2,956,070 A | 10/1960 | Jennings et al. |
| 3,242,055 A | 3/1966 | De Lucia |
| 3,365,063 A | 1/1968 | Cobb |
| 3,528,912 A | 9/1970 | Boyle et al. |
| 3,610,418 A | 10/1971 | Calderwood |
| 3,659,400 A | 5/1972 | Kester |
| 3,700,592 A | 10/1972 | De Pree |
| 3,853,712 A | 12/1974 | House et al. |
| 3,896,212 A | 7/1975 | Eickmeyer et al. |
| 3,910,780 A | 10/1975 | Henley et al. |
| 3,925,534 A | 12/1975 | Singleton |
| 4,032,616 A | 6/1977 | Artur et al. |
| 4,046,529 A | 9/1977 | Fletcher et al. |
| 4,047,894 A | 9/1977 | Kuhl |
| 4,067,809 A | 1/1978 | Kato |
| 4,072,615 A | 2/1978 | McConnell |
| 4,073,686 A | 2/1978 | Adams |
| 4,112,052 A | 9/1978 | Sartori et al. |
| 4,137,298 A | 1/1979 | Zielke et al. |
| 4,162,298 A | 7/1979 | Holladay et al. |
| 4,234,419 A | 11/1980 | Coillet |
| 4,266,026 A | 5/1981 | Breslau |
| 4,292,199 A | 9/1981 | Rohrbach et al. |
| 4,307,195 A | 12/1981 | Karasawa et al. |
| 4,307,298 A | 12/1981 | El Hamamsy et al. |
| 4,336,233 A | 6/1982 | Appl et al. |
| 4,427,416 A | 1/1984 | Bonaventura |
| 4,434,144 A | 2/1984 | Giammarco et al. |
| 4,452,676 A | 6/1984 | Birbara et al. |
| 4,521,387 A | 6/1985 | Broecker et al. |
| 4,537,839 A | 8/1985 | Cameron |
| 4,563,202 A | 1/1986 | Yao et al. |
| 4,681,605 A | 7/1987 | Gollan |
| 4,681,612 A | 7/1987 | O'Brien et al. |
| 4,696,803 A | 9/1987 | Nieh et al. |
| 4,710,362 A | 12/1987 | Nieh |
| 4,770,676 A | 9/1988 | Sircar et al. |
| 4,814,104 A | 3/1989 | Kubek |
| 5,000,768 A | 3/1991 | Hwang |

(Continued)

FOREIGN PATENT DOCUMENTS

| AU | 7753398 | 12/1998 |
| CA | 950364 | 7/1974 |

(Continued)

OTHER PUBLICATIONS

John P. Allen PhD, "An Enzymic Concept for CO2 Control in Closed Environmental Control Systems," Technical Report AFFDL-TR-65-48, Aug. 1965, 56 pages, Air Force Flight Dynamics Laboratory, Research Technology Division, Air Force Systems Command, Wright-Patterson Air Force Base, Ohio, USA.

John P. Allen, "Investigation of the Enhancement of Carbon Dioxide Absorption by Amines With the Enzyme Carbonic Anhydrase," Technical Report AFFDL-TR-66-23, May 1966, 42 pages, Air Force Flight Dynamics Laboratory, Research Technology Division, Air Force Systems Command, Wright-Patterson Air Force Base, Ohio, USA.

George Graf, Youngstown University, "Regenerative Control of CO2 in Air by Carbonic Anhydrase," Technical Report AFFDL-TR-66-62, May 1966, 182 pages, Air Force Flight Dynamics Laboratory, Research Technology Division, Air Force Systems Command, Wright-Patterson Air Force Base, Ohio, USA.

(Continued)

Primary Examiner — Edward Johnson
(74) Attorney, Agent, or Firm — Myers Bigel Sibley & Sajovec, P.A.

(57) ABSTRACT

A process is disclosed for recycling carbon dioxide emissions from a fossil-fuel power plant into useful carbonated species The process primarily comprises the steps of: a) burning the fossil fuel, thereby generating heat and a hot exhaust gas containing $CO_2$; and b) converting the heat into energy. The process is characterized in that it further comprises the steps of: c) cooling the exhaust gas; and d) biologically transforming the $CO_2$ contained in the cooled exhaust gas into carbonated species, thereby obtaining a low $CO_2$ exhaust gas and producing useful carbonated species. The low $CO_2$ exhaust gas obtained in step d) can be released in the atmosphere without increasing the problem of greenhouse effect.

37 Claims, 2 Drawing Sheets

U.S. PATENT DOCUMENTS

| | | | |
|---|---|---|---|
| 5,005,787 A | 4/1991 | Cullingford |
| 5,057,421 A | 10/1991 | Hofmann et al. |
| 5,061,455 A | 10/1991 | Brose et al. |
| 5,104,803 A | 4/1992 | Delente et al. |
| 5,112,740 A | 5/1992 | Nealon et al. |
| 5,116,506 A | 5/1992 | Williamson et al. |
| 5,137,828 A | 8/1992 | Robinson et al. |
| 5,141,823 A | 8/1992 | Wright et al. |
| 5,143,847 A | 9/1992 | Kawase et al. |
| 5,169,051 A | 12/1992 | Noe |
| 5,182,201 A | 1/1993 | Tsuda |
| 5,226,506 A | 7/1993 | Link |
| 5,232,676 A | 8/1993 | Wolff et al. |
| 5,242,827 A | 9/1993 | Chaumont et al. |
| 5,246,619 A | 9/1993 | Niswander |
| 5,248,567 A | 9/1993 | Amemiya et al. |
| 5,293,751 A | 3/1994 | Asai |
| 5,304,356 A | 4/1994 | Iijima et al. |
| 5,364,611 A | 11/1994 | Iijima et al. |
| 5,389,120 A | 2/1995 | Sewell |
| 5,455,013 A | 10/1995 | Shibata et al. |
| 5,486,475 A | 1/1996 | Kramer et al. |
| 5,514,378 A | 5/1996 | Mikos et al. |
| 5,547,586 A | 8/1996 | Halperin et al. |
| 5,603,908 A | 2/1997 | Yoshiba et al. |
| 5,609,838 A | 3/1997 | Neuman et al. |
| 5,618,506 A | 4/1997 | Suzuki et al. |
| 5,624,812 A | 4/1997 | Hattori et al. |
| 5,665,319 A | 9/1997 | Hirama et al. |
| 5,667,561 A | 9/1997 | Suzuki et al. |
| 5,674,463 A | 10/1997 | Dao et al. |
| 5,683,356 A | 11/1997 | Halperin et al. |
| 5,690,099 A | 11/1997 | Abramov et al. |
| 5,744,078 A | 4/1998 | Soroushian et al. |
| 5,746,985 A | 5/1998 | Takahashi |
| 5,759,712 A | 6/1998 | Hockaday |
| 5,766,339 A | 6/1998 | Babu |
| 5,772,887 A | 6/1998 | Noah et al. |
| 5,785,739 A | 7/1998 | Baker |
| 5,795,750 A | 8/1998 | Kruse et al. |
| 5,830,423 A | 11/1998 | Trocciola et al. |
| 5,861,303 A | 1/1999 | Barshter et al. |
| 5,869,323 A | 2/1999 | Horn |
| 5,888,256 A | 3/1999 | Morrison |
| 5,902,747 A | 5/1999 | Nemser et al. |
| 5,938,819 A | 8/1999 | Seery |
| 5,945,002 A | 8/1999 | Leukes et al. |
| 5,972,684 A | 10/1999 | Bandman et al. |
| 5,997,594 A | 12/1999 | Edlund et al. |
| 6,010,900 A | 1/2000 | Cherry |
| 6,036,931 A | 3/2000 | Yoshida et al. |
| 6,051,161 A | 4/2000 | Suzuki et al. |
| 6,051,411 A | 4/2000 | Turtakovsky et al. |
| 6,071,484 A | 6/2000 | Dingman et al. |
| 6,082,133 A | 7/2000 | Barclay et al. |
| 6,110,370 A | 8/2000 | Van Hille et al. |
| 6,117,404 A | 9/2000 | Mimura et al. |
| 6,128,919 A | 10/2000 | Daus et al. |
| 6,170,264 B1 | 1/2001 | Viteri et al. |
| 6,174,720 B1 | 1/2001 | Oxley et al. |
| 6,187,277 B1 | 2/2001 | Kirschner |
| 6,187,465 B1 | 2/2001 | Galloway |
| 6,203,599 B1 | 3/2001 | Schubert et al. |
| 6,210,567 B1 | 4/2001 | Takada |
| 6,221,117 B1 | 4/2001 | Edlund et al. |
| 6,240,859 B1 | 6/2001 | Jones, Jr. |
| 6,245,304 B1 | 6/2001 | Jansen et al. |
| 6,254,667 B1 | 7/2001 | Saito et al. |
| 6,270,731 B1 | 8/2001 | Kato et al. |
| 6,274,108 B1 | 8/2001 | Fujii et al. |
| 6,290,754 B1 | 9/2001 | Peytavy |
| 6,299,744 B1 | 10/2001 | Narayanan et al. |
| 6,299,994 B1 | 10/2001 | Towler et al. |
| 6,364,938 B1 | 4/2002 | Birbara et al. |
| 6,387,212 B1 | 5/2002 | Christian |
| 6,389,814 B2 | 5/2002 | Viteri et al. |
| 6,432,698 B1 | 8/2002 | Gaugler et al. |
| 6,440,711 B1 | 8/2002 | Dave |
| 6,447,437 B1 | 9/2002 | Lee et al. |
| 6,475,382 B2 | 11/2002 | Parent |
| 6,475,460 B1 | 11/2002 | Max |
| 6,598,398 B2 | 7/2003 | Viteri et al. |
| 7,596,952 B2 * | 10/2009 | Fradette et al. ............ 60/772 |
| 8,066,965 B2 | 11/2011 | Fradette et al. |
| 8,277,769 B2 * | 10/2012 | Fradette et al. ............ 423/432 |
| 2001/0022952 A1 | 9/2001 | Rau et al. |
| 2002/0086307 A1 | 7/2002 | Amin et al. |
| 2002/0095951 A1 | 7/2002 | Ha |
| 2003/0017088 A1 | 1/2003 | Downs et al. |
| 2003/0055117 A1 | 3/2003 | O'Rear et al. |

FOREIGN PATENT DOCUMENTS

| | | |
|---|---|---|
| CA | 1078300 | 5/1980 |
| CA | 1143910 | 4/1983 |
| CA | 1188630 | 6/1985 |
| CA | 1190470 | 7/1985 |
| CA | 1194399 | 10/1985 |
| CA | 1214316 | 11/1986 |
| CA | 2002227 | 6/1990 |
| CA | 2030391 | 5/1991 |
| CA | 1291787 | 11/1991 |
| CA | 1294758 | 1/1992 |
| CA | 2200130 | 9/1997 |
| CA | 2297785 | 12/1998 |
| CA | 2294531 | 2/1999 |
| CA | 2320216 | 8/1999 |
| CA | 2322871 | 9/1999 |
| CA | 2352969 | 5/2000 |
| CA | 2255287 | 6/2000 |
| CA | 2361809 | 8/2000 |
| CA | 2268641 | 1/2001 |
| CA | 2326024 | 6/2001 |
| CA | 2332079 | 8/2001 |
| CA | 2329113 | 6/2002 |
| CN | 1101626 | 4/1995 |
| CN | 1227255 | 9/1999 |
| DE | 3218232 | 2/1984 |
| DE | 3729695 | 3/1988 |
| DE | 4032557 | 4/1992 |
| DE | 4419766 | 12/1995 |
| DE | 19840691 | 3/2000 |
| EP | 180670 | 5/1986 |
| EP | 207277 | 1/1987 |
| EP | 315468 | 5/1989 |
| EP | 376219 | 7/1990 |
| EP | 511719 | 11/1992 |
| EP | 558019 | 9/1993 |
| EP | 649385 | 4/1995 |
| EP | 677883 | 10/1995 |
| EP | 700107 | 3/1996 |
| EP | 879631 | 11/1998 |
| EP | 948390 | 10/1999 |
| EP | 991462 | 4/2000 |
| FR | 2669918 | 6/1992 |
| FR | 2758740 | 7/1998 |
| GB | 103290 | 12/1917 |
| GB | 384060 | 12/1932 |
| GB | 587101 | 4/1947 |
| GB | 848528 | 9/1960 |
| GB | 1102943 | 2/1968 |
| GB | 1120483 | 7/1968 |
| GB | 1306853 | 2/1973 |
| GB | 2076849 | 12/1981 |
| IT | 1260517 | 12/1993 |
| JP | 52138477 | 11/1977 |
| JP | 57130527 | 8/1982 |
| JP | 58208117 | 12/1983 |
| JP | 60014908 | 1/1985 |
| JP | 2000699 | 1/1990 |
| JP | 2109986 | 4/1990 |
| JP | 4084883 | 3/1992 |
| JP | 5049881 | 3/1993 |
| JP | 6011599 | 1/1994 |
| JP | 6198122 | 7/1994 |
| JP | 6263665 | 9/1994 |
| JP | 7068164 | 3/1995 |
| JP | 8252430 | 10/1996 |

| | | |
|---|---|---|
| JP | 9110485 | 4/1997 |
| JP | 9132494 | 5/1997 |
| JP | 9168775 | 6/1997 |
| JP | 10130045 | 5/1998 |
| JP | 10314758 | 12/1998 |
| JP | 110501180 | 1/1999 |
| JP | 11050069 | 2/1999 |
| JP | 11235999 | 8/1999 |
| JP | 2000072981 | 3/2000 |
| JP | 2000119049 | 4/2000 |
| JP | 2000239670 | 9/2000 |
| JP | 2000287679 | 10/2000 |
| JP | 2000300983 | 10/2000 |
| JP | 2001039751 | 2/2001 |
| JP | 2001070726 | 3/2001 |
| TW | 432741 | 5/2001 |
| WO | 9524959 | 9/1995 |
| WO | 9640414 | 12/1996 |
| WO | 9855210 | 12/1998 |
| WO | 0003126 | 1/2000 |
| WO | 0010691 | 3/2000 |
| WO | 0104045 | 1/2001 |
| WO | 0117896 | 3/2001 |
| WO | 0123302 | 4/2001 |
| WO | 0125140 | 4/2001 |
| WO | 0165621 | 9/2001 |
| WO | 0183364 | 11/2001 |
| WO | 0209849 | 2/2002 |

OTHER PUBLICATIONS

Douglas N. Dean et al., "Batch Absorption of CO2 by Free and Microencapsulated Carbonic Anhydrase," Ind. Eng. Chem., Fundam., vol. 16, No. 4, 1977, pp. 452-458 (7 pages).

Terrence L. Donaldson et al., "Kinetic Constants Determined from Membrane Transport Measurements: Carbonic Anhydrase Activity at High Concentrations," Proc. Nat. Acad. Sci. USA, vol. 71, No. 12, pp. 4995-4999, Dec. 1974.

"Gas Absorption Mechanism in Catalytic Slurry Reactors" by E. Alper et al; Chemical Engineering Science vol. 35, pp. 217-222, Pergamon Press Ltd., 1980, Printed in Great Britain (6 pages).

* cited by examiner

PROCESS FOR TREATING CARBON DIOXIDE CONTAINING GAS

CROSS REFERENCE TO RELATED APPLICATIONS

This application is a continuation application of U.S. application Ser. No. 13/273,391; filed Oct. 14, 2011 now U.S. Pat. No. 8,277,769, now allowed, which is a continuation of U.S. application Ser. No. 12/586,857; filed Sep. 28, 2009, issued on Nov. 29, 2011 as U.S. Pat. No. 8,066,965, which is a continuation of U.S. application Ser. No. 10/529,168; filed on Mar. 24, 2005, issued on Oct. 6, 2009 as U.S. Pat. No. 7,596,952, which is a 35 U.S.C. §371 national stage application of PCT Application No. PCT/CA03/01496; filed on Sep. 29, 2003; and claims the benefit of Canadian Application No. 2405635; filed on Sep. 27, 2002.

FIELD OF THE INVENTION

The present invention relates generally to processes and apparatuses used for energy production in fossil-fuel power plants. More particularly, it concerns a process and a plant for the sequestration of carbon dioxide emissions emanating from fossil-fuel power plants, and for the production of useful carbonated species.

BACKGROUND OF THE INVENTION

Fossil-fuel power plants produce the main part of the energy actually consumed worldwide. Energy is generated from the combustion of fossil-fuels such as coal, natural gas and fuel oil. The use of biomass to fuel the power plant is also within the scope of this invention. Main exhaust gases formed from such processes may be $CO_2$, $SO_2$ and $NO_x$ depending on the nature of the fuel used. Treatment systems are already available for reducing $SO_2$ and $NO_x$ emissions. However to date, $CO_2$ emissions from fossil-fuel power plants are generally not contained or reduced. These $CO_2$ emissions thus contribute to increase the atmospheric concentration of $CO_2$, the most important greenhouse gas. It is known that such an increase in greenhouse gases causes climate changes which could lead to various environmental problems, such as an increase in violent weather events, significant temperature warming in specific areas, changes in the precipitation pattern trends and a rise of ocean level.

Moreover, in the next century, a significant increase of carbon dioxide concentrations is expected, unless energy production systems reduce their emissions into the atmosphere. Carbon sequestration consisting of carbon capture, separation and storage or reuse represents potent ways to stabilize and eventually reduce concentration of atmospheric $CO_2$.

Several technologies, based on carbon sequestration, are being studied by academic and industrial groups. These are: transformation by algae, sequestration in oceans, storage in depleted oil and natural gas wells and dissolution of pressurized $CO_2$ in water tables. $CO_2$ can also be transformed into more geologically stable forms, such as calcium carbonate.

Transformation of $CO_2$ with algae involves the use of algal photosynthesis. The gas emitted by power stations is thus directly introduced in basins located nearby. The selected algae must therefore support these environments with harsh conditions. The algae produced could be dried up and used as fuel to supply the power station. This approach reduces the required fuel to supply power, but does not eliminate $CO_2$ production completely.

Sequestration in oceans consists in pumping the carbon dioxide to be disposed of to depths of 1,000 metres below sea level. The technique is based on the fact that $CO_2$ possesses a higher density than water. It is believed that $CO_2$ will sink to the bottom of oceans where lakes of liquid carbon dioxide will be formed. However, as yet, the environmental impact of this technology has not been demonstrated (U.S. Pat. No. 6,475,460). Another way is to bring carbon dioxide and seawater or fresh water into contact to form carbon dioxide hydrate and sinking it in the seawater, fresh water or geological formation under conditions for the stability of carbon dioxide hydrate (CA 2,030,391, patent application US 2003/0055117, patent application US 2003/0017088; U.S. Pat. No. 6,254,667).

Oil and natural gas wells are capable of supporting enormous pressures without leakage. They are therefore an ideal location for the storage of compressed $CO_2$ (patent application CA 2,320,216; U.S. Pat. No. 6,598,398; U.S. Pat. No. 6,389,814; U.S. Pat. No. 6,170,264). In the petroleum industry, the injection of $CO_2$ in wells to enhance oil recovery is a widely used technique. However, this method only constitutes a temporary storage, since in the medium term, the displacements of the earth crust are capable of bringing about a release of $CO_2$. Moreover, although there are hundreds of depleted sites around the world, their total capacity is after all limited, and there is an obligation to land case the geological formations involved.

The deep water tables are distributed throughout the globe. They generally include salt water and are separated from the surface water tables which constitute the drinking water supplies. The water contained in these natural reservoirs can dissolve the pressurized $CO_2$ and even disperse it in the geological formations. However, the implementation of this technology must always imply a strong concern regarding the proximity of the water tables with the $CO_2$ emission sources.

$CO_2$ sequestration in solid carbonates and/or bicarbonates has already been reported in Lee et al. (U.S. Pat. No. 6,447,437). However, $CO_2$ chemical transformation into bicarbonate fertilizer requires methane, hydrogen and nitrogen. Kato et al. (U.S. Pat. No. 6,270,731) reported $CO_2$ sequestration into carbon powder. However, methane and hydrogen are required. Shibata et al. (U.S. Pat. No. 5,455,013) reported $CO_2$ sequestration into $CaCO_3$. However, the chemical process enables $CO_2$ sequestration into $CaCO_3$ only. Other carbonates cannot be obtained.

Although some solutions have been proposed in the past for reducing $CO_2$ emissions in general, few of them have shown to be efficient or commercially viable for different reasons. Moreover, a very few, if not none, of the solutions proposed specifically apply to $CO_2$ emissions from fossil-fuel power plants. Thus, there is still a need for a solution for reducing those $CO_2$ emissions from fossil-fuel power plants. With the general concern throughout the world with respect to the urgency of finding a solution to the problem of emissions of greenhouse gases, this need is even more obvious.

SUMMARY OF THE INVENTION

An object of the present invention is to provide a process and a fossil-fuel power plant that satisfy the above mentioned need.

This process is characterized in that it comprises a step where the $CO_2$ emissions from the fossil-fuel power plant are transformed by means of a biological process into different useful carbonated species, such as calcium carbonate, a geological natural product.

More particularly, in accordance with the present invention, the above object is achieved with a process for recycling carbon dioxide emissions from a fossil-fuel power plant into useful carbonated species, which process primarily comprises the steps of: a) combustion of a fossil fuel, thereby generating heat and a hot exhaust gas containing $CO_2$; and b) converting the heat into energy. The process is characterized in that it further comprises the steps of: c) cooling the exhaust gas; and d) biologically transforming at least a portion of the $CO_2$ contained in the cooled exhaust gas into carbonated species, thereby obtaining a low $CO_2$ exhaust gas and producing useful carbonated species. The low $CO_2$ exhaust gas obtained in step d) can be released in the atmosphere without increasing the problem of greenhouse effect.

By biological process, it is meant a process involving the activity of living organisms.

More particularly, the step d) of biologically transforming the $CO_2$ defined above preferably comprises the steps of: catalyzing the hydration of at least a portion of the $CO_2$ contained in the exhaust gas, and producing a solution containing hydrogen ions and carbonate ions. Then, metal ions are added to the solution, and the pH is adjusted to precipitate a carbonate of that metal. These metal ions are preferably selected from the group consisting of calcium, barium, magnesium and sodium ions. More preferably, Ca++ is used and the carbonate obtained is $CaCO_3$.

The hydration is catalyzed by a biocatalyst capable of catalyzing the hydration of dissolved $CO_2$ into hydrogen ions and bicarbonate ions. More preferably, the biocatalyst is selected from the group consisting of enzyme, cellular organelle, mammal cells and vegetal cells. Most preferably, the biocatalyst is the enzyme carbonic anhydrase or an analogue thereof.

$CO_2$ transformation takes place inside a bioreactor and is performed by a biocatalyst which accelerates the transformation of $CO_2$ into bicarbonate in an aqueous environment. The bicarbonate can then be precipitated into a stable solid product.

This invention thus proposes the integration of a $CO_2$ transformation process into a fossil-fuel power plant in order to produce bicarbonate species which are useful by-products, and thereby reducing at the same time the $CO_2$ emissions. This $CO_2$ transformation process is based on a biological reactor which enables $CO_2$ transformation into bicarbonate in an aqueous environment. The $CO_2$ is then precipitated into a stable solid product, safe for the environment. As can be appreciated, in the present invention, only water, a biocatalyst and a cation source are required for carbon dioxide sequestration.

In accordance with a preferred aspect of the invention, step d) of biologically transforming the $CO_2$ comprises the step of: feeding liquid $H_2O$ and at least a portion of the exhaust gas, preferably all, into a bioreactor containing therein a reaction chamber filled with the biocatalyst. The biocatalyst is optionally immobilized on solid supports packing the bioreactor or in suspension in a liquid phase. In that latter case, the biocatalyst may be either free in the aqueous liquid phase, immobilized on solid supports or entrapped inside a solid matrix.

The present invention also provides a power plant for producing energy from fossil fuel, and recycling carbon dioxide emissions into carbonated species. The plant comprises a combustion unit for burning fossil fuel, thereby producing heat and an exhaust gas containing $CO_2$; and conventional means for converting the heat into energy. The plant is characterized in that it further comprises: means for cooling the exhaust gas; and biological means for biologically transforming at least a portion of the $CO_2$ from the cooled exhaust gas into hydrogen ions and carbonate ions, and means for precipitating carbonated species.

The biological means preferably comprises a bioreactor including a reaction chamber filled with a biocatalyst capable of catalyzing the hydration of dissolved $CO_2$ into hydrogen ions and bicarbonate ions. The reaction chamber preferably comprises:
- a liquid inlet for receiving an aqueous liquid;
- a gas inlet for receiving the cooled exhaust gas to be treated;
- a gas outlet for releasing a low $CO_2$ gas; and
- a liquid outlet for releasing a solution containing carbonate ions.

Also preferably, the precipitation means comprises a precipitation vessel, wherein the bicarbonate ions can react with metal ions and precipitate a carbonate of that metal.

GENERAL DESCRIPTION OF THE INVENTION $CO_2$ Production in a Fossil Fuel Power Plant $CO_2$ is produced during combustion of fossil fuels such as coal, natural gas or fuel oil (Equation 1). For the purpose of the present invention, fossil-fuel power plant is also directed to power plants using biomass as the fuel. In the case of a coal power plant, the heat released during this combustion is used to heat water and produce steam which then passes through steam turbines coupled to electric alternators leading to electricity generation. In the case of a natural gas power plant, the fuel is burned directly in gas turbines coupled to electric alternators.

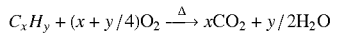

$$C_xH_y + (x+y/4)O_2 \xrightarrow{\Delta} xCO_2 + y/2H_2O \quad \text{Equation 1}$$

Other gases may also be produced by combustion, namely $SO_2$ and $NO_x$ given the original sulphur and nitrogen content of the used fuel. These other gases are encountered mainly in coal power plants.

Flue gas exhausting from combustion chambers and containing $CO_2$ is discharged directly to the atmosphere. In the context of this invention, $CO_2$ emissions are treated and reduced by a biological process.

In the case of coal power plants, flue gas has first to be cooled in order to have a temperature that does not lead to the denaturizing (free and/or immobilized) of the biocatalyst. Gas cooling is obtained with any type of heat exchanging device, and the recovered energy is preferably used to increase the process efficiency. The heat could, for example, be used to pre-heat the air required for combustion, or to supply energy for additional turbines. The gas is then preferably treated to remove excess ash, $SO_2$ and $NO_x$, in order that the gas be of optimum quality for the biological process. Ash can be removed using units such as electrostatic precipitators and fabric filters. $SO_2$ can be removed using scrubber units and $NO_x$ using burners or catalytic systems leading to the conversion of $NO_x$ to $N_2$ and $H_2O$. These units, which are used to remove ash, $SO_2$ or $NO_x$, are already known in prior art and do not need further description.

$CO_2$ Transformation in a Biological Process

Gas phase containing $CO_2$ with appropriate level of ash, $SO_2$, $NO_x$ and at appropriate temperature and pressure, is then fed to the biological process, enabling $CO_2$ transformation into bicarbonate and hydrogen ions, and then to useful carbonated species. This biological process is preferably performed in a biological reactor where $CO_2$ transformation takes place. This transformation is catalyzed by a biocatalyst accelerating $CO_2$ transformation. The biocatalyst is a biological entity which can transform a substrate in one or more products. The biocatalyst is preferably an enzyme, a cellular organelle (mitochondrion, membrane, etc.), and animal, vegetal or human cells. More preferably, the biocatalyst is the enzyme carbonic anhydrase but may be any biological catalyst enabling $CO_2$ transformation. $CO_2$ transformation reaction is the following:

$$CO_2 + H_2O \xrightleftharpoons{enzyme} HCO_3^- + H^+ \quad \text{Equation 2}$$

This reaction is natural. It is at the basis of $CO_2$ transportation and removal phenomenon in the human body and in most living beings.

The biological catalyst may be free or immobilized inside the biological reactor. An example of a bioreactor which could be used for biological transformation of $CO_2$ is described in "Process and Apparatus for the Treatment of Carbon Dioxide with Carbonic Anhydrase" (Blais et al.) (CA 2,291,785; WO98/55210). In this process, carbonic anhydrase is immobilized onto solid supports. Solid supports can be made of various organic and inorganic material and have shapes proper to packed columns. The gas phase containing $CO_2$ enters at the bottom of the packed column and the liquid phase enters at the top of the column. Both phases flow counter currently and close contact of liquid and gas phases is promoted by a solid support having immobilized enzymes on its surface. Gaseous $CO_2$ is then transferred to the liquid phase where it dissolves and then is transformed according to Equation 2. The liquid flows in and out of the column and is treated for precipitating the bicarbonate ions produced by the bioreaction.

Another biological reactor with free and/or immobilized enzymes for $CO_2$ transformation into bicarbonate is the following.

The bioreactor consists of a chamber containing biocatalyst particles. The gas to be treated enters at the bottom of the chamber. A diffusion system is responsible for the uniform distribution of the gas phase at the bottom of the chamber and is designed for minimum bubble diameter. These conditions are required to optimize gas-liquid contact. An agitation device (magnetic or mechanical) can also be used to assure uniform biocatalyst distribution. Liquid phase enables gas dissolution and thus the biocatalytic reaction. In this process, the biocatalyst (preferably carbonic anhydrase, but may be any biological catalyst) is free in the liquid phase and/or immobilized onto a solid support and/or entrapped inside a solid matrix. These particles are moving freely in the liquid and are prevented from exiting the chamber by a membrane or filter. The liquid flows in and out of the chamber and is treated for precipitation of the bicarbonate ions produced by the bioreaction.

As mentioned, bicarbonate ions produced in these two types of bioreactors are preferably precipitated and finally sequestrated. This precipitation is obtained by combining bicarbonate ions to cations. Cations used are preferably calcium, barium, magnesium, sodium or any cation that could lead to the formation of carbonate or bicarbonate salts. As shown in FIG. 2, a potential source of cations is the reagent solution coming out of the $SO_2$ treatment unit. Bicarbonate ions can also be used directly in other chemical or biological processes.

In summary, $CO_2$ is to be transformed, for example into calcium carbonate, in the biological process, according to the following reactions:

$$CO_2 \text{ dissolved} + H_2O \Rightarrow H^+ + HCO_3^-$$

$$HCO_3^- \Rightarrow H^+ + CO_3^{2-}$$

$$CO_3^{2-} + Ca^{2+} \Rightarrow CaCO_3$$

The coupling of the biological process for $CO_2$ removal and transformation to a fossil-fuel power plant leads to a reduction of $CO_2$ emissions into the atmosphere and an increase energy efficiency of the plant. Furthermore, the required cooling of the flue gas enabling proper operation of the bioreactor is coupled with energy recovery systems that produce additional power output for the power plant.

MORE DETAILED DESCRIPTION OF PREFERRED EMBODIMENTS

Figure 1:
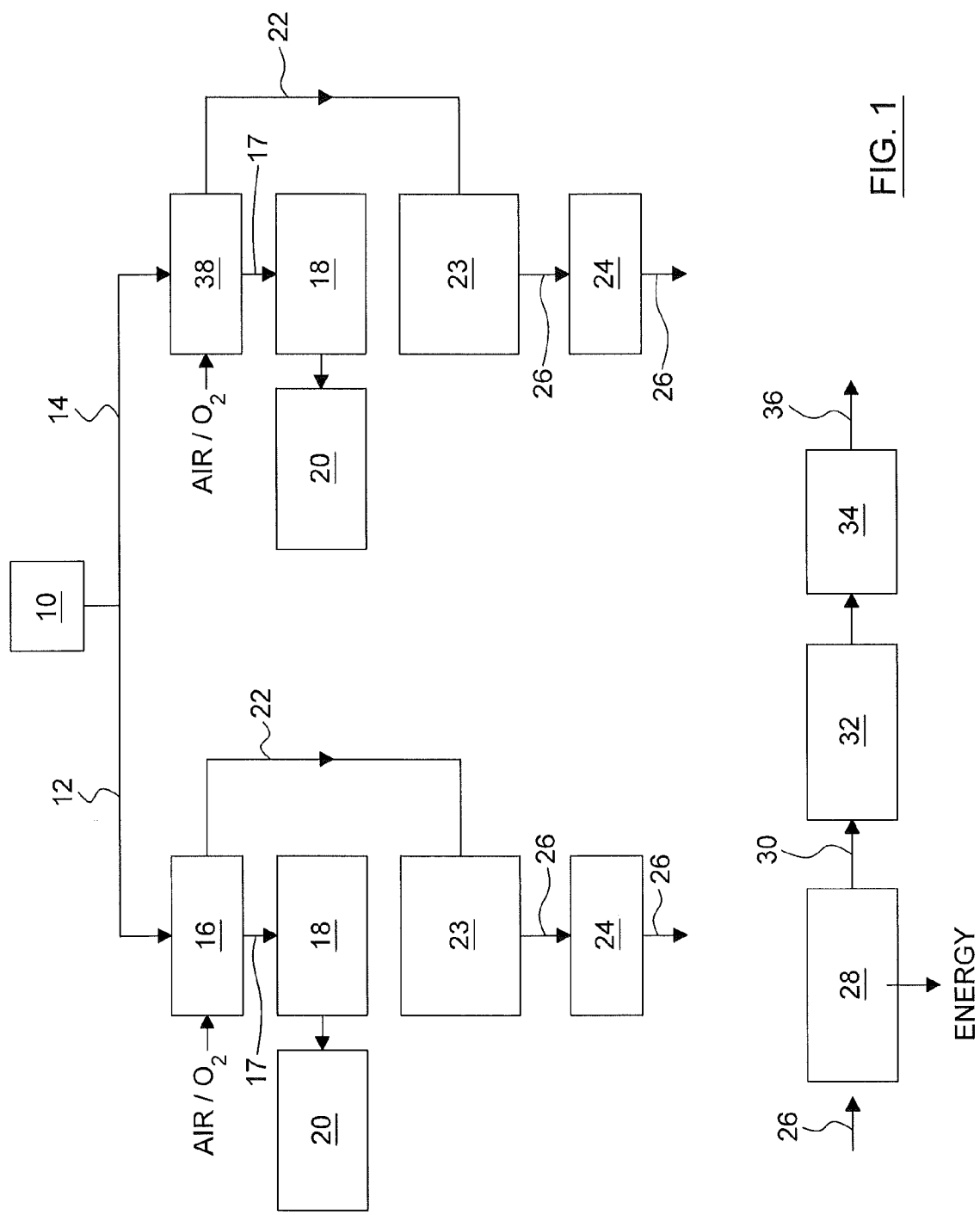
FIG. 1 is a flow sheet of a preferred embodiment of the process according to the invention, in the context of power plant processes.

FIG. 1 shows a flow sheet where a biological process is integrated to energy generation processes.

In this diagram, the nature of the fossil fuel (10), either coal (12) or natural gas (14), used to power the plant leads to two different branches.

In the case of coal (12), the fuel is burned in a combustion chamber (16); the heat (17) is used to produce steam from water in a heat recovery steam generator system (18). The steam propels turbines and alternators (20) producing electric power. The flue gas (22) exiting the combustion chamber (16) is treated to remove ash, NO and/or $SO_2$ (23). In the current configuration of power plants, the gas is finally exhausted by a stack (24).

In the context of this invention, the gas (26) is not exhausted at this stage, but rather sent to additional heat exchangers and energy recovery systems (28) to cool it down to an adequate temperature for the biological process. Energy is produced by this step. The cooled gas (30) is then treated in a gas treatment unit (32) to remove additional contaminants that may be harmful to the biological process, and finally, $CO_2$ is removed by the bioreactor (34) and the low $CO_2$ gas (36) is blown to the atmosphere.

In the case of natural gas (14), the fuel (14) is burned directly in the turbine (38), and the intermediary step of steam production is not present in the main power production stage, although it may be used in subsequent heat recovery stages. The rest of the process is analog to that of the left branch (coal).

Figure 2:
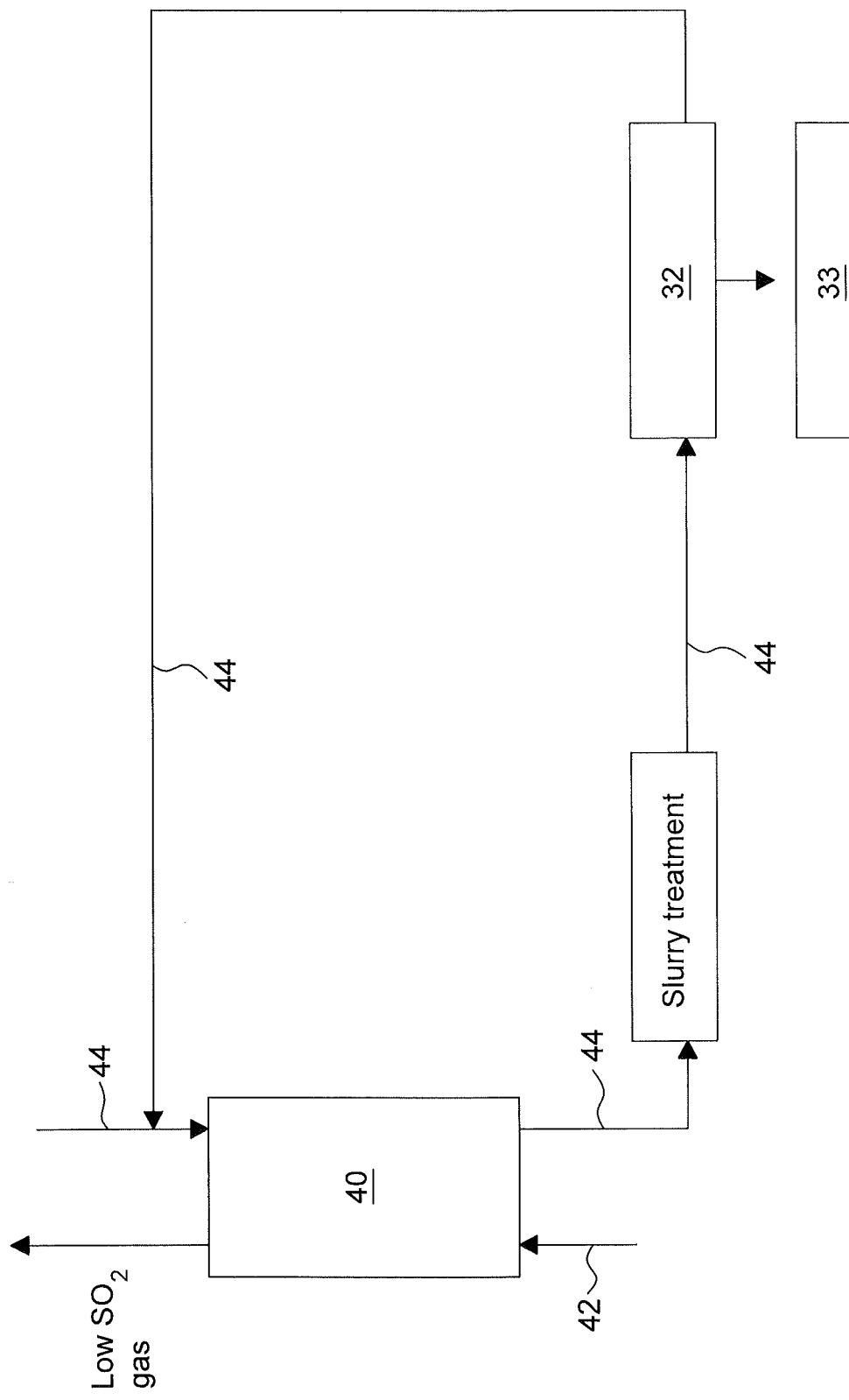
FIG. 2 is a flow sheet of a further preferred embodiment of the process according to the invention, in the context of power plant processes.

FIG. 2 is a flow sheet schematically showing the integration of the biological process (32) to a $SO_2$ treatment unit (40).

This diagram shows the cross-linking that may be performed between the biological process, which produces carbonate and/or bicarbonate ions (33), and the $SO_2$ treatment unit (40) present in the current power plant process. To remove $SO_2$ from the flue gas (42), a reagent solution (44) is required. An analog solution is also required for the biological process (32). This solution (44), readily available from either sub-processes, may be used in closed loop for both processes.

Experimental Results

The feasibility of treating flue gas from power plant by a biological process has been demonstrated. The lab scale biological process enabled $CO_2$ absorption and its transformation into $CaCO_3$. The biological process was performed with a 3 operation units each comprising a 3 L-bioreactor containing 2 L of packing material with immobilized carbonic anhydrase for $CO_2$ absorption. The units also included two ion exchange columns required for recovering and concentrating the bicarbonate ions and a precipitation and sedimentation vessel for formation and recovery of solid $CaCO_3$. The bioreactor used was similar to the one described in "Process and Apparatus for the Treatment of Carbon Dioxide with Carbonic Anhydrase" (Blais et al.) (CA 2,291,785; WO98/55210), and was operated at room temperature and atmospheric pressure. Gas phases with $CO_2$ concentrations ranging from 0.5 to 12% were efficiently treated with the bioreactor. $CO_2$ removal rate ranged from $1.47 \times 10^{-4}$ to $4.5 \times 10^{-3}$ mol $CO_2$/min. Bicarbonate ions produced were recovered and concentrated in ion exchange columns. The removal of ions enabled the recycling of the $CO_2$ absorbent used in the bioreactor. A carbonate/bicarbonate rich solution was obtained following regeneration of ion exchangers. A calcium source, $CaCl_2$ was added to the bicarbonate/carbonate rich solution, conducting to the formation of precipitated calcium carbonate. A carbon mass balance indicated that carbon dioxide removed from the gas was recovered as precipitated $CaCO_3$.

These results indicate that the biological process can be used to manage $CO_2$ emissions from power plants. Moreover, valuable products such as $CaCO_3$ are produced.

Although the present invention has been explained hereinabove by way of preferred embodiments thereof, it should be understood that the invention is not limited to these precise embodiments and that various changes and modifications may be effected therein without departing from the scope or spirit of the invention.

What is claimed is:

1. A process comprising:
   a) combustion of a fossil fuel or biomass, thereby generating heat and a hot exhaust gas containing $CO_2$;
   b) using said heat to produce steam from water in a steam generator;
   c) cooling at least a portion of said exhaust gas to produce a cooled exhaust gas; and
   d) reducing the amount of $CO_2$ contained in the cooled exhaust gas, thereby obtaining a low $CO_2$ exhaust gas, wherein the step of reducing the amount of $CO_2$ comprises:
      contacting an aqueous liquid phase with the cooled exhaust gas to cause at least a portion of the $CO_2$ to dissolve into the aqueous liquid phase and catalyzing the hydration of at least a portion of the dissolved $CO_2$ and producing a solution containing hydrogen ions and bicarbonate ions; and wherein said hydration is catalyzed by carbonic anhydrase or an analogue thereof.

2. The process of claim 1, wherein the enzyme carbonic anhydrase or the analogue thereof is free in the aqueous liquid phase.

3. The process of claim 1, wherein the enzyme carbonic anhydrase or the analogue thereof is immobilised on a support which is in suspension in the aqueous liquid phase.

4. The process of claim 1, wherein the enzyme carbonic anhydrase or the analogue thereof is entrapped inside a solid.

5. The process of claim 4, where the solid comprises a solid matrix.

6. The process of claim 1, wherein the enzyme carbonic anhydrase or the analogue thereof is entrapped inside a matrix or immobilized on supports which are mounted within a reactor.

7. The process of claim 1, wherein the steam produced in step b) is used to produce electricity.

8. The process of claim 7, wherein the steam produced in step b) is provided to a heat recovery steam generator system.

9. The process of claim 1, wherein step d) comprises adding cations to the solution and adjusting the pH of the solution to precipitate a carbonated species of the cation.

10. The process of claim 9, wherein the cations are selected from the group consisting of calcium, barium, magnesium and sodium ions.

11. The process of claim 1, wherein the step of reducing the amount of $CO_2$ in the cooled exhaust gas comprises biologically removing said $CO_2$.

12. A process comprising:
   combustion of a fossil fuel or biomass, thereby generating heat and a $CO_2$ containing exhaust gas;
   using said heat to produce steam from water in a steam generator;
   reducing the amount of $CO_2$ contained in the $CO_2$ containing exhaust gas, thereby obtaining a low $CO_2$ gas, comprising contacting an aqueous liquid phase with the $CO_2$ containing exhaust gas to cause at least a portion of the $CO_2$ to dissolve into the aqueous liquid phase and catalyzing the hydration of at least a portion of the dissolved $CO_2$ and producing a solution containing hydrogen ions and bicarbonate ions; and wherein the hydration is catalyzed by carbonic anhydrase or an analogue thereof.

13. The process of claim 12, wherein the enzyme carbonic anhydrase or the analogue thereof is free in the aqueous liquid phase.

14. The process of claim 12, wherein the enzyme carbonic anhydrase or the analogue thereof is immobilised on a support which is in suspension in the aqueous liquid phase.

15. The process of claim 12, wherein the enzyme carbonic anhydrase or the analogue thereof is entrapped inside a solid.

16. The process of claim 15, where the solid comprises a solid matrix.

17. The process of claim 12, wherein the enzyme carbonic anhydrase or the analogue thereof is entrapped inside a matrix or immobilized on supports which are mounted within a reactor.

18. The process of claim 12, comprising adding cations to the solution and adjusting the pH of the solution to precipitate a carbonated species of the cation.

19. The process of claim 12, wherein the cations are selected from the group consisting of calcium, barium, magnesium and sodium ions.

20. The process of claim 12, wherein the $CO_2$ containing gas comprises exhaust gas generated by combustion of fossil fuel or biomass.

21. A process comprising:
   pre-treating a $CO_2$ containing gas to remove contaminants and produce a contaminant reduced gas;
   reducing the amount of $CO_2$ contained in the contaminant reduced gas, thereby obtaining a low $CO_2$ gas, by contacting an aqueous liquid phase with the contaminant reduced gas to cause at least a portion of the $CO_2$ to dissolve into the aqueous liquid phase and catalyzing the hydration of at least a portion of the dissolved $CO_2$ and producing a solution containing hydrogen ions and bicarbonate ions; and wherein the hydration is catalyzed by carbonic anhydrase or an analogue thereof.

22. The process of claim 21, wherein the contaminants removed are selected from the group consisting of ash, $NO_x$ and $SO_2$.

23. The process of claim 21, wherein the pre-treating comprises scrubbing the $CO_2$ containing gas.

24. The process of claim 23, wherein the scrubbing is performed while cooling the $CO_2$ containing gas to produce a cooled $CO_2$ containing gas with a temperature sufficiently low to allow feeding directly into the step of biologically removing the $CO_2$.

25. The process of claim 21, wherein the $CO_2$ containing gas is cooled to a temperature sufficiently low so as to maintain a desired catalytic effect of the enzyme carbonic anhydrase or the analog thereof.

26. The process of claim 25, wherein the temperature to which the $CO_2$ containing gas is cooled avoids a given denaturing of free carbonic anhydrase.

27. The process of claim 25, wherein the temperature to which the $CO_2$ containing gas is cooled avoids a given denaturing of immobilized carbonic anhydrase.

28. The process of claim 21, wherein the enzyme carbonic anhydrase or the analogue thereof is free in the aqueous liquid phase; immobilised on a support which is in suspension in the aqueous liquid phase; entrapped inside a matrix which is in suspension in the aqueous liquid phase; or entrapped inside a matrix or immobilized on supports which are mounted within a reactor.

29. The process of claim 21, comprising adding cations to the solution and adjusting the pH of the solution to precipitate a carbonated species of the cation.

30. The process of claim 29, wherein the cations are selected from the group consisting of calcium, barium, magnesium and sodium ions.

31. The process of claim 21, wherein the $CO_2$ containing gas comprises hot exhaust gas generated by combustion of fossil fuel or biomass.

32. The process of claim 31, wherein heat is removed from the hot exhaust gas prior to reducing the amount of $CO_2$ contained therein and the heat is recycled.

33. A process comprising:
generating a $CO_2$ containing gas;
ensuring that the $CO_2$ containing gas has a temperature sufficiently low so as to maintain a desired catalytic effect of carbonic anhydrase or analog thereof;
reducing the amount of $CO_2$ contained in the $CO_2$ containing gas, thereby obtaining a low $CO_2$ gas, comprising:
contacting an aqueous liquid phase with the $CO_2$ containing gas to cause at least a portion of the $CO_2$ to dissolve into the aqueous liquid phase and catalyzing the hydration of at least a portion of the dissolved $CO_2$ and producing a solution containing hydrogen ions and bicarbonate ions; and wherein said hydration is catalyzed by the carbonic anhydrase or the analogue thereof.

34. The process of claim 33, wherein the $CO_2$ containing gas is subjected to a cooling step.

35. The process of claim 33, wherein the $CO_2$ containing gas comprises hot exhaust gas generated by combustion of fossil fuel or biomass and wherein heat is removed from the hot exhaust gas in a heat exchanger prior to reducing the amount of $CO_2$ contained therein.

36. A process comprising:
generating steam using heat derived from combustion;
cooling an exhaust gas containing $CO_2$ to produce a cooled exhaust gas, said exhaust gas being derived from the combustion;
reducing the amount of $CO_2$ contained in the cooled exhaust gas, thereby obtaining a low $CO_2$ exhaust gas, wherein the step of reducing the amount of $CO_2$ comprises:
contacting an aqueous liquid phase with the cooled exhaust gas to cause at least a portion of the $CO_2$ to dissolve into the aqueous liquid phase and catalyzing the hydration of at least a portion of the dissolved $CO_2$ and producing a solution containing hydrogen ions and bicarbonate ions; and wherein said hydration is catalyzed by carbonic anhydrase or an analogue thereof.

37. A process comprising:
cooling an exhaust gas containing $CO_2$ to produce a cooled exhaust gas, said exhaust gas being derived from combustion for producing heat used to generate steam;
reducing the amount of $CO_2$ contained in the cooled exhaust gas, thereby obtaining a low $CO_2$ exhaust gas, wherein the step of reducing the amount of $CO_2$ comprises:
contacting an aqueous liquid phase with the cooled exhaust gas to cause at least a portion of the $CO_2$ to dissolve into the aqueous liquid phase and catalyzing the hydration of at least a portion of the dissolved $CO_2$ and producing a solution containing hydrogen ions and bicarbonate ions; and wherein said hydration is catalyzed by carbonic anhydrase or an analogue thereof.

* * * * *

UNITED STATES PATENT AND TRADEMARK OFFICE
CERTIFICATE OF CORRECTION

PATENT NO.        : 8,435,479 B2                                    Page 1 of 1
APPLICATION NO.   : 13/592422
DATED             : May 7, 2013
INVENTOR(S)       : Fradette et al.

It is certified that error appears in the above-identified patent and that said Letters Patent is hereby corrected as shown below:

In the Claims:
Column 8, Claim 19, Line 52: correct "of claim 12,"
　　　　　　　　　　　　　　　to read -- of claim 18, --

Signed and Sealed this
Twenty-second Day of April, 2014

Michelle K. Lee
*Deputy Director of the United States Patent and Trademark Office*